United States Patent Office.

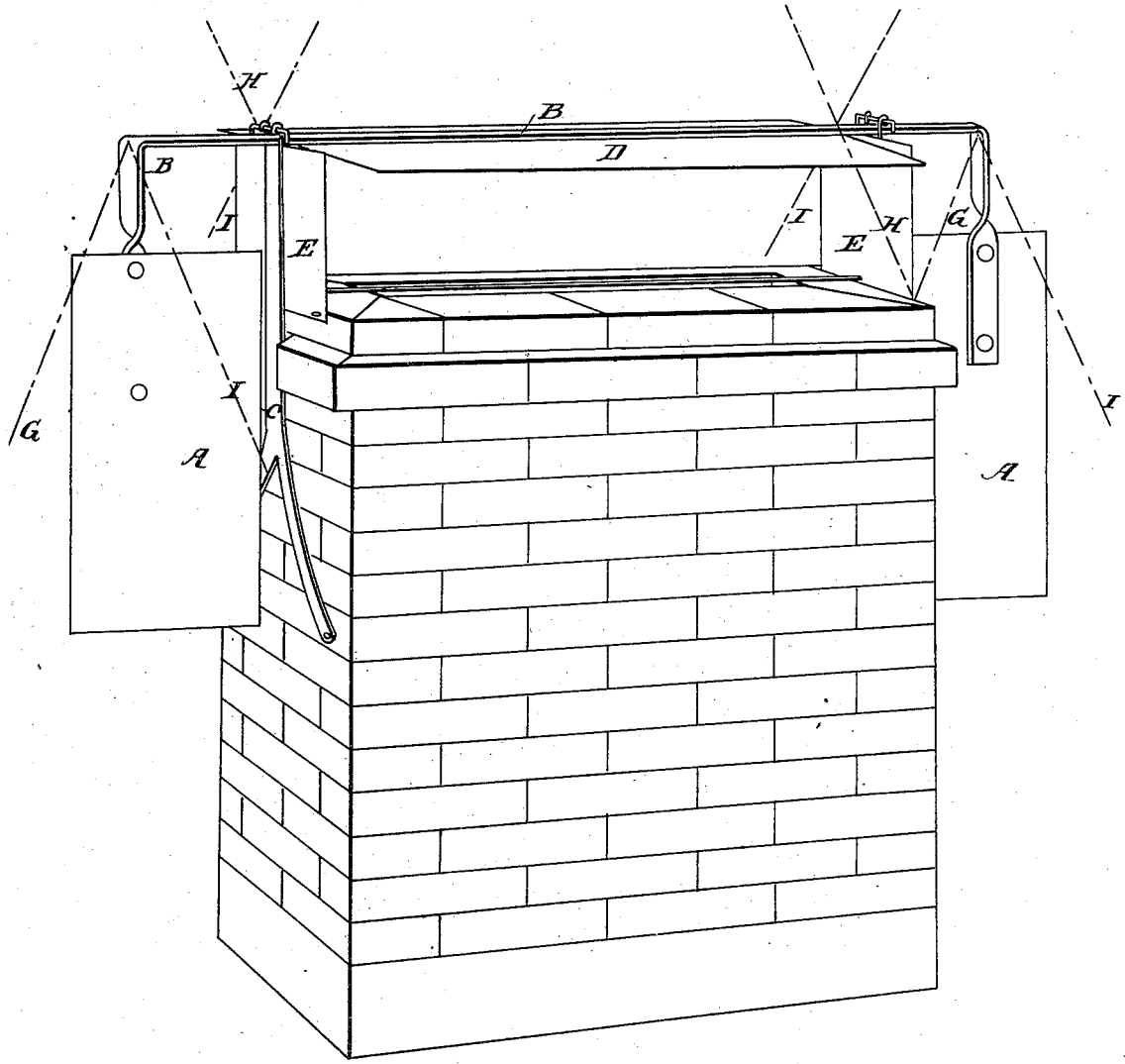

JOHN A. WAGGONER, OF KILGORE, OHIO

Letters Patent No. 65,969, dated June 18, 1867.

---

CHIMNEY-COWL.

---

The Schedule referred to in these Letters Patent and making part of the same.

---

TO ALL WHOM IT MAY CONCERN:

Be it known that I, J. A. WAGGONER, of Kilgore, in the county of Carroll, and State of Ohio, have invented certain new and useful improvements in Chimney-Jacks; and I do hereby declare that the following is a full and complete description thereof, reference being had to the accompanying drawings, making a part of this specification, in which the drawing represents a perspective view of the chimney-jack. Like letters refer to like parts in the view presented.

This jack consists of a pair of dependent vanes or wings, A, attached to the arms of the shaft B, and supported across the top of the chimney by the standards C. D is a broad plate secured to the shaft B at a right angle to the dependent arms, thus covering the top of the chimney, and elevated a short distance above, as shown in the drawing. The ends of this plate are embraced by the sides E, and between which it is made to oscillate by the swinging of the vanes A, as follows: The wind on striking the vanes causes them to swing back in the direction of the dotted line G; this causes the plate to turn in the direction indicated by the dotted lines H, bringing one edge of the plate down upon the top of the chimney, and closing it against the wind, which is prevented thereby from descending the flue, while the smoke escapes freely from the chimney on the opposite side of the plate. Should the wind blow in the opposite direction, the wings will cause a corresponding reversion in the position of the plate, as indicated by the dotted lines I, and thus close the chimney from the wind by bringing the opposite side of the plate down upon the top as before; hence the wind is completely prevented from blowing down into the chimney, while there is offered no obstruction to a free escape of the smoke. The side E enclosing the ends of the plate wards off the wind when blowing in that direction, and being covered by the plate D, the wind cannot be deflected down the chimney; hence it is equally protected on all sides, without in any way offering the least obstruction to the free escape of the smoke.

What I claim as my improvement, and desire to secure by Letters Patent, is—

The wings A, plate D, and sides E, when constructed and arranged in combination with a chimney as and for the purpose set forth.

JOHN A. WAGGONER.

Witnesses:
HENRY PATTON,
JOSIAH SCOTT.